Figure 1:
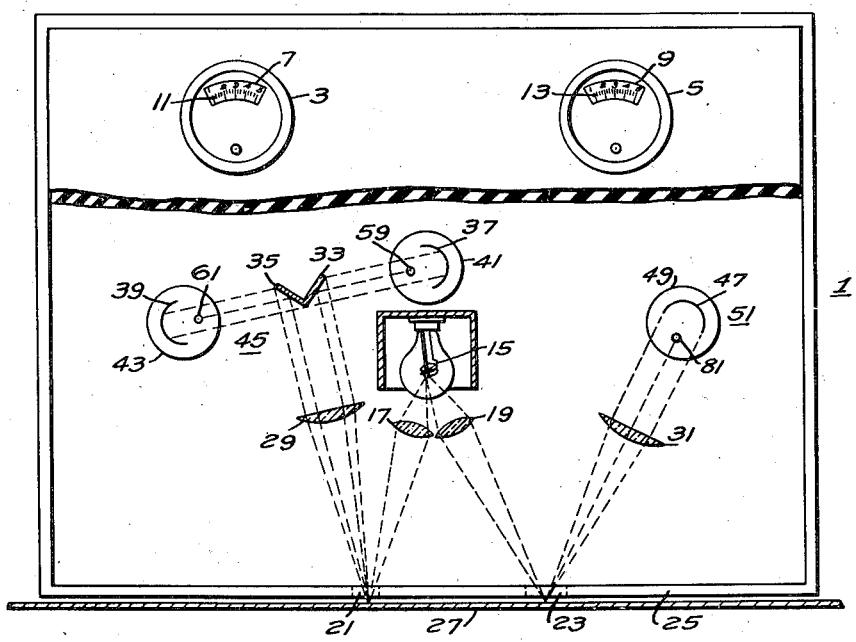

April 19, 1938.   E. D. WILSON   2,114,867
PHOTOSENSITIVE APPARATUS
Filed Nov. 27, 1934

WITNESSES:
E. A. McCloskey
R. W. Bailey

INVENTOR
Earl D. Wilson.
BY F. W. Lyle.
ATTORNEY

Patented Apr. 19, 1938

2,114,867

UNITED STATES PATENT OFFICE 2,114,867

PHOTOSENSITIVE APPARATUS

Earl D. Wilson, Wilkinsburg, Pa., assignor to Westinghouse Electric & Manufacturing Company, East Pittsburgh, Pa., a corporation of Pennsylvania Application November 27, 1934, Serial No. 754,980

3 Claims. (Cl. 209—111)

This application is a continuation in part of my copending application Serial No. 524,878, filed March 24, 1931, for Photo-sensitive apparatus, now Patent No. 2,008,410, dated July 16, 1935.

My invention relates to photo-sensitive devices and has particular relation to photo-sensitive color-matching and sorting apparatus.

In color-matching of materials two principal characteristics of the light reflected from the surface of the material must necessarily be observed. Not only is the color important but the shade is also of considerable importance. Two surfaces having substantially the same color and different shades may yield unequal responses in an inspection device while two surfaces may differ in color and in shade in such manner that the response of an inspection device is the same for both of them, in spite of the fact that their colors are different.

In apparatus constructed according to the teachings of the prior art, of which I am aware, a plurality of specimens are matched as to color by comparing the light from a polychromatic source reflected from their surfaces. In apparatus of this type, the inspection device responds to the total light reflected from the surface of the specimens, and consequently, two specimens differing in color by a finite degree may yield the same total effect and, from the indication displayed in the inspection device, may be regarded as matched.

An improvement of the hereinabove mentioned apparatus of the prior art has been suggested and comprises a system wherein the light sources utilized in the color analysis of the specimens are of the monochromatic type. For a satisfactory color matching, with a system of this type, the specimens must be successively inspected with monochromatic radiations of at least three distinct colors. The structure and operation of systems of this type occasions considerable difficulty and the system is, at best, only a compromise.

It is, accordingly, an object of my invention to provide apparatus for matching and sorting specimens with regard to their true colors.

Another object of my invention is to provide apparatus whereby specimens may be matched and sorted, as to their true colors, with facility.

A further object of my invention is to provide apparatus for sorting objects, not only with regard to their colors but also with regard to their shades.

A still further object of my invention is to provide accurate color-matching and sorting apparatus of a type wherein a single source of substantially white light shall be utilized.

More concisely stated, it is an object of my invention to provide a practical method and an easily manipulated apparatus for sorting specimens of material, as regards their colors and shades.

According to my invention, I provide a color-matching system comprising a plurality of units, preferably of the photo-sensitive type. One unit is responsive to differences in color but is not responsive to differences in the total illuminating flux reflected from the surface of a sample. The other unit is responsive to differences in the total illuminating flux reflected from the surface of the sample but is not responsive to differences in color.

Under ordinary circumstances, a plurality of given specimens of material are matched against a predetermined specimen. The photo-sensitive units, to which reference is made hereinabove, are ordinarily equipped with independent indicating instruments, such as meters, for example. Before the specimens are matched with the predetermined sample, the units are subjected to the influence of white light reflected from the original sample, which may be regarded as a standard.

The constants of the circuit associated with the two photo-sensitive devices are adjusted in such manner that the indicating instruments, associated with the devices, yield a predetermined reading. The inspecting units are then subjected to the influence of the specimens to be matched, and, if the instrument, associated with the unit responsive to color, varies from the predetermined reading to which it was set, the specimen is known to be different in color from the original specimen. On the other hand, if the indicating instrument, associated with the unit that is responsive to the variations in the total illumination reflected from the specimen, indicates a value different from the original set value, the specimen is known to be different in its shade, from the original specimen.

In place of these indicating instruments or in addition thereto, I may also attach automatic sorting apparatus to these photo-sensitive units.

The unit responsive to color differences but not to differences in total light flux ordinarily comprises a plurality of photo-tubes of such characteristics that their color-sensitivity curves are radically different, while their total sensitivities are substantially equal. It is a well known fact that photo-tubes of the caesium-oxide type may be so selected that their characteristics are as specified above. The tubes so selected are connected differentially to yield a zero reading in an indicating instrument when subjected to the influences of ordinary white light. However, if they are subjected to the influence of light of a predetermined color, the reading of the instrument is some finite value depending on the color.

The other unit, which is responsive to total intensity but not to color, comprises, preferably, a photo-sensitive tube of the caesium-magnesium type slightly corrected by means of a suitable filter. A tube of this type is capable of yielding substantially uniform response to all colors of the spectrum of the light emitted from the filament of a tungsten lamp heated to a temperature of 2870° Kelvin.

The combined action of these two units control the automatic distribution of specimens as to the desired color and shade as hereinafter described.

Figure 2:
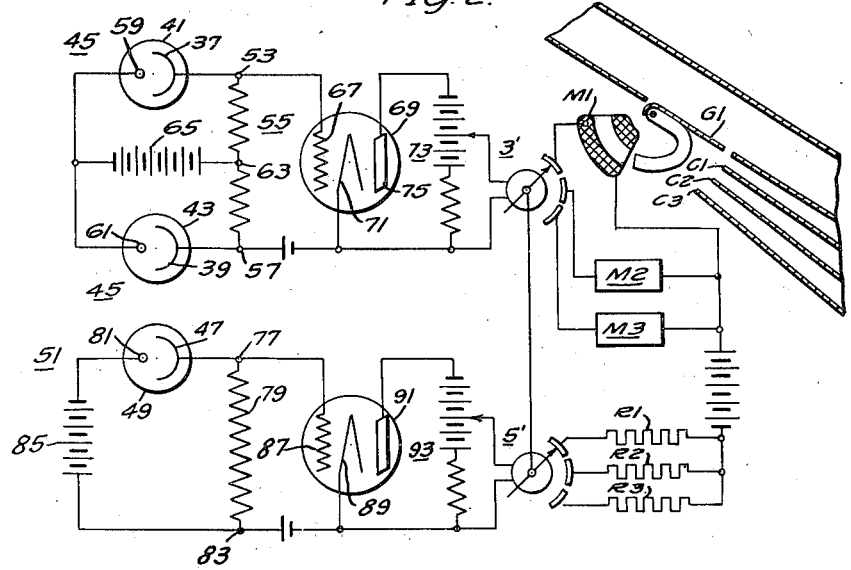

The novel features that I consider characteristic of my invention are set forth with particularity in the appended claims. The invention itself, however, both as to its organization and to its method of operation, together with additional objects and advantages thereof, will best be understood from the following description of a specific embodiment, when read in connection with the accompanying drawing, in which:

Figure 1 is a view, in elevation, the cover being partly broken away, showing, partly schematically, the essential elements of an embodiment of my invention, and Fig. 2 is a view partly in elevation and partly diagrammatic of a preferred combination of circuits and an automatic sorting machine.

The apparatus shown in the drawing comprises a container 1 actuating, for example, a plurality of instruments 3 and 5 disposed therein. The scales 7 and 9 and pointers 11 and 13 of the instruments 3 and 5 may be observed through openings in the side of the container 1.

A source of light 15 is conveniently disposed within the container 1 and its rays are directed by a plurality of lenses 17 and 19, to a plurality of openings or slots 21 and 23 in one side 25 of the container 1. A specimen 27 to be inspected is disposed adjacent to the side 25 of the container 1 and the rays from the source 15 are reflected therefrom and are collimated by a plurality of lenses 29 and 31.

The collimated rays reflected through one slot 21 in the container 1 are sub-divided by a plurality of mirrors 33 and 35, properly oriented relative to each other, and are reflected to the respective cathodes 37 and 39 of a plurality of photo-tubes 41 and 43 of the unit 45, whereby the specimen is inspected for color. It is to be noted that the reflectors 33 and 35 should be so disposed, relative to each other, that the total flux of the light reflected to one cathode 37 is substantially equal to the total flux of the light reflected to the other cathode 39.

The beam of light reflected through the other slot 23 in the container 1, after being collimated, impinges on the cathode 47 of the photo-tube 49 of the unit 51 that is responsive to differences in total flux of light but not to differences in color.

For color matching purposes under ordinary circumstances, the standard sample with which the specimens are to be compared, is disposed in such manner that the two sub-divided rays from the source 15 are reflected therefrom, and the meters 3 and 5 are adjusted to read zero. For the zero adjustment, suitable variable impedances may be provided in the circuits of the two units 45 and 51.

After the zero adjustment is made, the standard sample is replaced by the specimens to be inspected, and the reaction of the two instruments 3 and 5 is observed. If the readings of both instruments lie within predetermined limits, the samples are regarded as being of the same color and of the same shade. If one instrument yields a reading beyond a predetermined limit, the sample is regarded as defective, as regards the property which the meter indicates.

The circuits associated with the units 45 and 51 are shown in detail in Fig. 2 actuating a preferred type of automatic sorting apparatus. In the unit 45 responsive to color, the cathode 37 of one photo-tube 41 is connected to one terminal 53 of an impedance 55, such as a resistor, while the cathode 39 of the other tube 43 is connected to the remaining terminal 57 of the impedance 55. The anodes 59 and 61 of the photo-tubes 41 and 43 are connected to the electrical center 63 of the impedance 55 through a power-supply source 65, such as a battery.

One terminal 53 of the impedance 55 is connected to the control electrode 67 of an amplifier comprising an electric-discharge device 69, such as a thermionic tube, while the remaining terminal 57 of the impedance is connected to the cathode 71 of the electric discharge device. The indicating instrument 3 is connected in the output circuit 73 of the electric-discharge device 69; that is, between the anode 75 and the cathode 71 of the device.

The photo-sensitive devices 41 and 43 are preferably of the caesium-oxide type with total sensitivities approximately equal but with materially different spectral response characteristics. Consequently if light of a definite spectral quality impinges on each of the cathodes 37 and 39 of the tubes 41 and 43, the output of one tube may be made to neutralize that of the other with the result that the net output of the circuit and the meter reading of the indicator 3 is zero. However, if the spectral quality of the light should change, there is a definite output and reading of the meter 3. This depends only on the distribution of spectral energy in the light impinging on the cathodes of both cells and is independent of the total energy of the flux. It, therefore, indicates color and not shade.

The unit 51, responsive to shade but not to color, comprises the photo-sensitive device 49, the cathode 47 of which is connected to one terminal 77 of an impedance 79, while the anode 81 thereof is connected to the remaining terminal 83 of the impedance 79, through a power source 85, such as a battery. The terminals 77 and 83 of impedance 79 are connected, respectively, to the control electrode 87 and to the cathode 89 of an amplifier comprising an electric-discharge device 91, while the indicating instrument 5 is connected in the output circuit 93 of the electric-discharge device, in a manner similar to the indicating instrument 3 of the unit 45.

The cell 49 is preferably of the caesium-magnesium type and is provided with a suitable filter to properly adjust its characteristic. The cell when properly connected is capable of yielding uniform response to light of all wave-lengths of the spectrum of the radiations emitted by a tungsten filament when heated to 2870° K. The filament 15 is preferably of the tungsten type and is preferably heated to 2870° K. The cell 49 is responsive to variations in the flux impinging on its cathode 47 and the output and the reading of the meter 5 gives indication of differences in shade but not of differences in color.

It will be noted that the specific circuits that are illustrated in the drawing and are described hereinabove are representative of a plurality of circuits well known in the art that may be utilized in the practice of my invention.

The circuits illustrated are merely those that I have found particularly useful in matching the colors of specimens by means of apparatus constructed according to my invention. Color-matching systems constructed according to my invention and incorporating other circuits, which will be apparent to those skilled in the art, should be regarded as equivalents that lie within the scope of my invention.

Fig. 2 also illustrates the application of my invention to the automatic sorting of specimens in accordance with their colors or shades, the sorting apparatus being of a preferred type.

In apparatus of this type, the specimens to be sorted are advanced by a conveyor which may be a belt or the sloping chute illustrated in such manner that their surfaces successively reflect the light from a source into the photo-sensitive units 45 and 51. If the color and shade of a particular specimen are such as to lie within a predetermined allowable region, the specimen is conveyed to one container. If the color lies without the predetermined region, the specimen is conveyed to a second container. If the shade lies without the region, the specimen is conveyed to a third container. Finally, if both the color and shade lie without this region, the specimen is conveyed to still another container.

The mechanical elements of apparatus for sorting the specimens may be varied in accordance with the type of specimens to be sorted.

A preferred type of sorting mechanism is illustrated on the right-hand side of Fig. 2. The output circuit of the photo-sensitive circuit 45 is connected to a switch as indicated at 3'. The other photo-sensitive circuit 51 is connected to another switch as indicated at 5' and these two switches are electrically connected together. Each switch has a number of sections thereon corresponding to the different responses of color at the output 3' of the circuit 45 or different shades as desired at the output 5' of the circuit 51. The conveyor can conveniently take the form of an inclined chute as shown with a gate G1 pivoted on its underside and under the control of a curved iron bar as illustrated. A number of coils M1, M2 and M3, for example corresponding in number to the number of segments at the output circuit 3' of the color response circuit 45 are connected in parallel between the segments and a source of current. A plurality of resistances such as R1, R2 and R3 are connected in parallel between the opposite end of the source of current and the segments at the switch on the output circuit of the shade responsive device 51 at 5'. When the device is in operation and a specimen of the desired color and shade passes down the chute across the slits 21 and 23, the output circuit of both 3' and 5' will remain at zero, so that the desired specimen will pass on down the chute. If the desired color is not present in the specimen, the switch at 3' will be actuated to another segment and so likewise, if the shade is not correct, the switch at 5' will be changed to another segment so that a different condition will exist in the coils and the gate G1 actuated to a position to sort the specimen into the compartments C1, C2 or C3 in accordance with its variation in color or shade or both color and shade. It is apparent that compartments may be placed so that the specimens may be sorted into quite a variety of various colors and shades thereof depending upon how complicated sorting mechanism is desired. The particular sorting mechanism is illustrative of a preferred form of sorting apparatus and many variations may be made in its various elements. The coils M1, M2 and M3 might be windings on a motor to revolve the compartments to the desired position. Other variations will be made in the sorting apparatus depending upon the simplicity or complexity desired.

Finally, it should be noted that the optical system of the equipment may be simplified considerably if the specimen 27 is compared through a single slot in container 1. In this case, the condensing lenses 17 and 19 are replaced by a single lens and the rays from the source are projected by the lens to the opening in the container. The rays are then reflected from the surface of the specimen 27, which abuts the opening to the color-responsive device 45, which is oriented at one angle relative to the opening and to the intensity-responsive device 51 which is oriented at another angle relative thereto.

Although I have shown and described certain specific embodiments of my invention, I am fully aware that many modifications thereof are possible. My invention, therefore, is not to be restricted except insofar as is necessitated by the prior art and by the spirit of the appended claims.

I claim as my invention:

1. A sorting device for articles comprising a source for projecting radiation upon the article, light-sensitive means adapted to produce an output current which varies mainly in accordance with the total radiation flux reflected thereon from the article, light-sensitive means adapted to produce an output current varying mainly in accordance with the spectral quality of radiations reflected thereon by said article, a plurality of groups of compartments, means for causing the articles being sorted to be deposited in one of said compartments, the particular one of said groups which contains the last-mentioned compartment being determined by the intensity of the last-mentioned output current, and the particular compartment in said group being determined by the first-mentioned output current.

2. A sorting device for articles comprising a source for projecting radiations upon the article, means comprising a light-sensitive device controlling an output circuit energized mainly in accordance with the total radiation flux reflected thereon by said article, a second means comprising a pair of light-sensitive devices controlling an output circuit energized mainly in accordance with the spectral quality of the radiation reflected thereon by said article, a plurality of groups of compartments, means for causing the articles being sorted to be deposited in one of said compartments, the particular one of said groups which contains said compartment being determined by the intensity of the energization of the last-mentioned output circuit, and the particular compartment in said group being determined by the intensity of the energization of the first-mentioned output circuit.

3. A sorting device for articles comprising a source for projecting radiations upon the article, means comprising a light-sensitive device having an output circuit energized mainly in accordance with the total radiation flux reflected thereon by said article, a second means comprising a pair of light-sensitive devices controlling an output circuit energized mainly in accordance with the spectral quality of the radiation reflected thereon by said article, a plurality of compartments, means for depositing in a particular one of said compartments each article which causes energization of the first-mentioned output circuit within a predetermined range only and causes energization of the second-mentioned output circuit within a predetermined range only, and means for depositing articles outside said ranges in other of said compartments.

EARL D. WILSON.